United States Patent
Rempel

(10) Patent No.: US 9,589,157 B2
(45) Date of Patent: Mar. 7, 2017

(54) PROTECTION AGAINST ACCESS VIOLATION DURING THE EXECUTION OF AN OPERATING SEQUENCE IN A PORTABLE DATA CARRIER

(75) Inventor: Christof Rempel, Munich (DE)

(73) Assignee: Giesecke & Devrient GmbH, München (DE)

( * ) Notice: Subject to any disclaimer, the term of this patent is extended or adjusted under 35 U.S.C. 154(b) by 364 days.

(21) Appl. No.: 13/581,955

(22) PCT Filed: Mar. 3, 2011

(86) PCT No.: PCT/EP2011/001054
§ 371 (c)(1),
(2), (4) Date: Aug. 30, 2012

(87) PCT Pub. No.: WO2011/110307
PCT Pub. Date: Sep. 15, 2011

(65) Prior Publication Data
US 2012/0324168 A1    Dec. 20, 2012

(30) Foreign Application Priority Data

Mar. 10, 2010   (DE) ........................ 10 2010 010 851

(51) Int. Cl.
*G06F 12/08*   (2016.01)
*G06F 21/79*   (2013.01)
(Continued)

(52) U.S. Cl.
CPC .............. *G06F 21/79* (2013.01); *G06F 21/00* (2013.01); *G06F 21/71* (2013.01); *G06F 21/558* (2013.01); *G06F 21/60* (2013.01)

(58) Field of Classification Search
CPC ......... G06F 21/00; G06F 21/558; G06F 21/60
See application file for complete search history.

(56) References Cited

U.S. PATENT DOCUMENTS 8,375,225 B1 *   2/2013   Ybarra ......................... 713/193
2002/0124178 A1   9/2002   Kocher et al.
(Continued)

FOREIGN PATENT DOCUMENTS

CA   2332350 A1   11/1999
DE   19822218 A1   11/1999
(Continued)

OTHER PUBLICATIONS

D. Page, "Partitioned Cache Architecture as a Side-Channel Defense Mechanism", Cryptology ePrint Archive, Report 2005/280, 2005.*

(Continued)

*Primary Examiner* — Charles Rones
*Assistant Examiner* — Tian-Pong Chang
(74) *Attorney, Agent, or Firm* — Workman Nydegger

(57) ABSTRACT

A method for protecting an operation sequence executed by a portable data carrier from spying out, wherein the data carrier has at least a processor core, a main memory and a cache memory with a plurality of cache lines. The processor core is able to access, upon executing the operation sequence, at least two data values, with the data values occupying at least one cache line in the cache memory and being respectively divided into several portions so that the occurrence of a cache miss or a cache hit is independent of which data value is accessed. A computer program product and a device have corresponding features. The invention serves to thwart attacks based on an evaluation of the cache accesses during the execution of the operation sequence.

12 Claims, 1 Drawing Sheet

(51) Int. Cl.
  *G06F 21/00* (2013.01)
  *G06F 21/71* (2013.01)
  *G06F 21/60* (2013.01)
  *G06F 21/55* (2013.01)

(56) References Cited

U.S. PATENT DOCUMENTS

| | | | |
|---|---|---|---|
| 2005/0166069 A1* | 7/2005 | Hashimoto et al. | 713/194 |
| 2007/0237326 A1* | 10/2007 | Nonaka et al. | 380/37 |
| 2008/0059711 A1* | 3/2008 | McKeen et al. | 711/129 |
| 2009/0010424 A1* | 1/2009 | Qi et al. | 380/28 |
| 2009/0311945 A1* | 12/2009 | Strasser et al. | 451/8 |
| 2010/0161881 A1 | 6/2010 | Nagadomi et al. | |
| 2010/0180083 A1* | 7/2010 | Lee et al. | 711/128 |
| 2010/0325374 A1* | 12/2010 | Cypher | G06F 12/0607 711/157 |

FOREIGN PATENT DOCUMENTS

| | | |
|---|---|---|
| WO | 9935782 A1 | 7/1999 |
| WO | 9967919 A2 | 12/1999 |
| WO | 02/091332 A2 | 11/2002 |
| WO | 2009110630 A1 | 9/2009 |

OTHER PUBLICATIONS

Wang, et al., "New Cache Designs for Thwarting Software Cache-Based Side Channel Attacks," Proceedings of the 34th Annual International Symposium on Computer Architecture, San Diego, CA, ACM Jun. 9-13, 2007 (p. 494-505).*
International Preliminary Report on Patentability and English Translation of the Written Opinion in PCT/EP2011/001054, dated Oct. 4, 2012.
Bodo Möller, "Securing Elliptic Curve Point Multiplication against Side-Channel Attacks," Information Security-ISC, Springer-Verlag LNCS 2200, pp. 324-334, Dec. 21, 2001 (cited in the Specification).
A. Menezes et al, "Handbook of Applied Cryptography", CRC Press, 1996, p. 71.
International Search Report for PCT/EP2011/001054, Jul. 19, 2011.
W. Rankl et al, "Handbuch Der Chipkarten", 5th Edition, 2008, pp. 740-771.

* cited by examiner

PROTECTION AGAINST ACCESS VIOLATION DURING THE EXECUTION OF AN OPERATING SEQUENCE IN A PORTABLE DATA CARRIER

BACKGROUND OF THE INVENTION

A. Field of the Invention

The invention relates generally to the technical field of protection from spying out in portable data carriers. More specifically the invention relates to the technical area of preventing the spying out of data to be kept secret when a portable data carrier executes an operation sequence and cache accesses take place in the process. A portable data carrier within the meaning of the present document can e.g. be a chip card (smart card) of different construction types or a chip module or other limited-resource system with at least a processor core, a main memory and a cache memory.

B. Related Art

Portable data carriers are frequently employed for security-critical applications, for example in financial transactions, for authentication in mobile communication, as signature card for electronic signature and so on. Since great damage could be caused by unauthorized use, secret data that are stored on such data carriers must be reliably protected from spying out and manipulation.

Various attack methods are known, in which physical parameters of the data carrier are measured during the program execution, so as to draw conclusions regarding data to be kept secret. For example in simple power analysis (SPA) the current consumption of the data carrier during a computation process is measured and examined. In contrast, in differential power analysis (DPA) the current consumption is statistically evaluated over a plurality of computation processes.

The above-mentioned attacks are generally referred to as side channel attacks, since the information flow does not take place via the primary communication channel of the data carrier, but bypassing it. Chapter 16.5.1 of the book "Handbuch der Chipkarten" ("Handbook of chip cards") by W. Rankl and W. Effing, Hanser Verlag, 5$^{th}$ edition, 2008, pages 740-771, gives an overview of various attack and thwarting methods. The thwarting of side channel attacks is also the object of various patent documents, such as for example of the publication prints DE 198 22 218 A1, WO 99/35782 A1, WO 99/67919 A2 and U.S. 2002/0124178 A1.

Examinations have shown that in high-performance data carriers having a cache memory there are additional possibilities for side channel attacks. For it is generally possible to determine on the basis of the time response and/or the current consumption pattern upon program execution whether a cache hit or a cache miss occurs. From this information in turn conclusions can be drawn regarding data to be kept secret, provided that these data are correlated with the executed operation sequence—and in particular with the data values that are accessed in this operation sequence.

As an example for an operation sequence in danger of spying out, the modular exponentiation of a data value v1 with an exponent d according to the well-known "square and multiply" method should be mentioned. This method is for example described as method 2.143 in the book "Handbook of applied cryptography" by A. Menezes, P. van Oorschot and S. Vanstone, CRC Press, 1996, page 71. A modular exponentiation is e.g. used in RSA computations. The exponent d forms the private RSA key and must therefore be protected from spying out.

The computation of $v1^d$ mod N according to the "square and multiply" method takes place in a loop, which is run through respectively once for each bit of the exponent d—starting with the most significant bit. Upon each cycle of the loop first an intermediate value v2 is squared.

If the contemplated bit of the exponent d has the value "1", further the intermediate value v2 is multiplied with the data value v1. In total the following method results; the bit positions of the exponent d are designated by d(i) for i=0, 1, ..., k, so that $d=\Sigma_{i=0, 1, ..., k} d(i) \cdot 2^i$ applies:

SET v2:=1
FOR i=k, (k−1), ..., 1, 0, EXECUTE
    SET v2:=v2·v2 mod N
    IF d(i)=1 THEN SET v2:=v2·v1 mod N After the computation process $v2=v1^d$ mod N applies. The access pattern to the data values v1 and v2 during the computation depends on the bits of the exponent d to be kept secret.

The data values v1 and v2 can for example have a size of 256 bytes (2048 bits) each. In portable data carriers the cache memory is generally relatively small and can e.g. have a size of 2 Kbytes. If the cache memory is already partly occupied by other data, then there is possibly sufficient space only for one of the two data values v1 and v2—but not for both. In this case at least one cache miss results in every loop cycle with d(i)=1, since at least the data value v1 must first be loaded. Upon consecutive loop cycles with d(i)=0, in contrast no cache misses occur, since it is always only the data value v2 that is accessed. As already mentioned it is to be expected that cache misses are recognizable from the power profile, so that an attacker can draw conclusions regarding the bits of the exponent d.

In some micro controllers special commands are provided to hold data in the cache permanently; this is referred to as "blocking" of the cache. Then, upon each access of the blocked data then exclusively cache hits occur. However, the volume of securely processable data is limited to the size of the cache. It would be desirable not to be subjected to this limitation.

Other micro controllers do not have any cache block commands. It would be desirable to reliably prevent attacks of the above-mentioned type also in this case.

Accordingly it is the object of the invention to solve the above-mentioned problems entirely or partly and to create a technology for protecting an operation sequence executed by a portable data carrier from spying out, wherein the attack scenario to be thwarted is based on an evaluation of the cache accesses—in particular of the cache hits and cache misses—during the execution of the operation sequence. In preferred embodiments the invention should also be applicable when the operation sequence accesses large data volumes or when the data carrier does not support cache block commands.

SUMMARY OF THE DISCLOSURE

The invention proceeds from the basic idea to arrange at least two data values which can be accessed during the execution of the operation sequence in such a fashion that, in every cache line containing a portion of a first data value, there is also contained a portion of a second data value. In this fashion it is ensured that, upon an access to one of the two data values, the occurrence of a cache miss or a cache hit is independent of whether the first or the second data value is accessed. In other words an attacker cannot draw any conclusions from the pattern of cache misses and cache hits as to in which order which data values were accessed.

Merely the total number of cache accesses can be read from the cache behavior, but it is not recognizable by which operation an access took place.

The occupation of the cache memory according to the invention is achieved in some embodiments in that the first and the second data value are stored in the main memory in an interleaved or interlaced fashion, so that upon loading a portion of one of these data values in a cache line, necessarily also a portion of the other data value is loaded into this cache line.

In some embodiments further data values are provided. If each cache line is sufficiently large to accommodate respectively one portion of each data value which the processor core is able to access upon executing the operation sequence, then in some embodiments these further data values are stored in the main memory with the first and second data value in an interleaved or interlaced fashion, so that each field in the main memory that contains a portion of one of the data values also contains respectively a portion of every other data value.

If, in contrast, the cache lines are not large enough, in some embodiments field groups are formed in the main memory, so that each field group that contains a portion of one of the data values also contains respectively a portion of every other data value. The operation sequence can be configured in the last-mentioned embodiments in such a fashion that, when the processor core accesses a portion of a data value contained in a field of a field group, also accesses to all other fields of these field group take place.

In some embodiments the data values are conceptually divided into several equal portions, wherein the number of bits in each portion of each data value is for example a clean power of two and a clean fraction of the number of bits in the reference data of each cache line. For example each portion can have 8 bits or 16 bits, when the number of bits in the reference data of each cache line amounts to 32 bits or 64 bits.

In some embodiments the operation sequence implements a method of the type mentioned at the outset, for example a "square and multiply" method for modular exponentiation. Embodiments of the invention can also be used in other operation sequences, for example for window methods for exponentiation, such as described for example in the mentioned "Handbook of Applied Cryptography" in chapter 14.82. Here in a first step a small number of values (v1, v2, . . . , vn) is computed. In a second step, depending on the exponent to be kept secret, respectively one multiplication with one of the values vi is carried out in a loop. A further application possibility of the invention are "double and add" methods for multiplication, especially in the computation of elliptical curves, such as described e.g. in Bodo Moeller; "Securing Elliptic Curve Point Multiplication against Side-Channel Attacks", ISC 2001, Springer LNVS, p. 324-334 or in WO 02/091332 A2. Such a "double and add" method can also be combined with a window method, the exponent being put into a suitable representation for this purpose.

The computer program product according to the invention has program commands to implement the method according to the invention. Such a computer program product can be a physical medium, e.g. a semiconductor memory or a disk or a CD-ROM. However, the computer program product can also be a non-physical medium, e.g. a signal conveyed via a computer network. In particular the computer program product can contain program commands which are incorporated in a portable data carrier in the course of its production or initialization or personalization.

The device according to the invention can in particular be a portable data carrier, e.g. a chip card or a chip module. Such a data carrier contains in the way known in the art at least a processor core, several memories and various auxiliary component groups, such as e.g. interface circuits, timers and connection elements.

In preferred further developments the computer program product and/or the device have features which correspond to the features mentioned in the present description and/or mentioned in the dependent method claims.

DESCRIPTION OF THE DRAWINGS

Further features, objects and advantages of the invention will result from the following description of an exemplary embodiment and several alternative embodiments. Reference is made to the schematic drawings.

DETAILED DESCRIPTION

Figure 1:
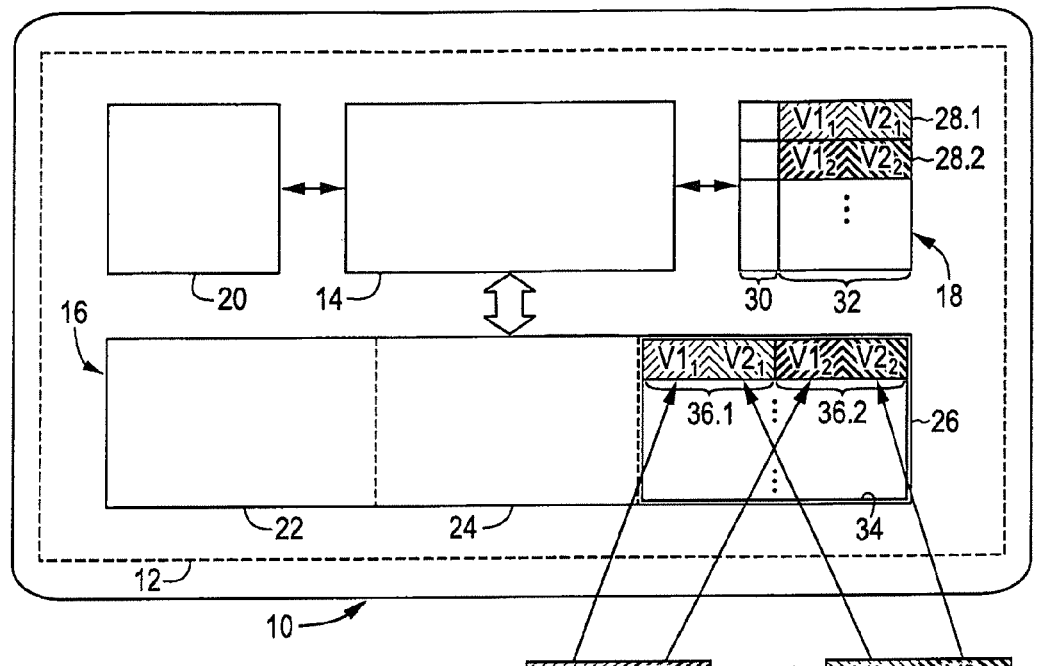
FIG. 1 shows a block diagram of a data carrier according to an exemplary embodiment of the invention.

The portable data carrier 10 represented in FIG. 1 is configured as a chip card or as a chip module. In the way known in the art the data carrier 10 contains a micro controller 12 that is configured as an integrated semiconductor chip with a processor core 14, a main memory 16, a cache memory 18 and an interface circuit 20. The main memory 16 is divided into several memory fields. In the present exemplary embodiment, a permanent memory 22 configured as a ROM, a non-volatile overwritable memory 24 configured as an EEPROM and a working memory 26 configured as a RAM are provided as memory fields. The cache memory 18 has a multiplicity of cache lines 28.1, 28.2, . . . , which are in the following summarily referred to as cache lines 28.x. Every cache line 28.x contains in the way known in the art management data 30—e.g. a validity bit and a tag—as well as reference data 32. In the exemplary embodiments described here it is assumed that the reference data 32 of every cache line 28.x consist of a predetermined number m of memory words. For example in every cache line 28.x four words reference data 32 can be contained (m=4), wherein the word width generally depends on the bus width of the micro controller 12 and can e.g. amount to one byte.

The cache lines 28.x are the smallest unit of the cache memory. This means that in a loading process into the cache memory 18 always all m words of the reference data 32 are written from the main memory 16 into the corresponding cache line 28.x, thereby overwriting all reference data 32 so far contained in the cache line 28.x.

The micro controller 12 is configured so that accesses to at least one area 34 of the main memory 16 take place via the cache memory 18. In the exemplary embodiments described here it is assumed for the sake of simplicity that this "cacheable" area 34 corresponds to the working memory 26. However, also such embodiments are possible in which the area 34 comprises only parts of the working memory 26 and/or additionally parts of the non-volatile overwritable memory 24.

Further, in the exemplary embodiment described here, it is assumed that the area 34 is conceptually divided into a multiplicity of fields 36.1, 36.2, . . . , which are in the following summarily referred to as fields 36.x. Each field 36.x also contains m words, which are transferred into exactly one cache line 28.x upon each process of subsequent loading. In other words data that are disposed in one single field 36.x are always loaded jointly in a single cache line 28.x. This does not imply that a field 36.x is loaded into the same cache line 28.x upon each loading process, even though there are some embodiments where this is the case.

In the exemplary embodiments described here the fields 36.x divide the area 34 without gap into groups of m memory words each, namely starting at an address 0. The $x^{th}$ field 36.x thus comprises the words with the addresses a, a+1, . . . a+m−1 for a start address a=m: (x−1). However, in alternative embodiments the fields 36.x can also be configured and arranged differently. In particular the fields 36.x need neither be of equal size, nor need they be arranged in a gapless and non-overlapping fashion. Rather, the fields 36.x can be any desired partial amounts of the area 34, which must merely have the property that the memory words of every field 36.x must always be captured jointly by one cache line 28.x.

FIG. 1 proceeds exemplarily from an operation sequence built up of two different types of operations, with both types of operations being able to access two data values v1 and v2 and being of a comparable operation type, so that they are practically indistinguishable, provided that the cache behavior is the same. The different operations are executed in an interleaved sequence, wherein the exact order of the accesses depends on a value to be kept secret and is to be concealed. Such an operation sequence was explained at the outset by the example of the "square and multiply" method. On the logical program level the data values v1 and v2 are to be understood as variables of the executed program. In the implementation on the data carrier 10, however, the data values v1 and v2 are disposed in the main memory 16 and, where applicable, additionally in the cache memory 18.

The present embodiment of the invention will now be explained by means of an example with very short data values v1 and v2, which each are only as long as the reference data 32 in a cache line 28.x. The first data value v1 is conceptually divided into two portions $v1_1$ and $v1_2$, and the second data value v2 is correspondingly divided into two portions $v2_1$ and $v2_2$. The data values v1 and v2 are stored in an interleaved fashion in the main memory 16, namely in such a fashion that respectively one portion of every data value v1, v2 is disposed in one respective field 36.x. More exactly the first field 36.1 contains the first two portions $v1_1$ and $v2_1$ of the two data values v1, v2, and the second field 36.2 contains the two second portions $v1_2$ and $v2_2$ of the two data values v1, v2.

The interleaved arrangement of the data values v1 and v2 is automatically transferred from the main memory 16 to the cache memory 18 since, as mentioned above, one field 36.x of the main memory 16 is loaded completely into exactly one cache line 28.x each upon each process of subsequent loading. Thus it is true for all cache lines 28.x that, when a portion (e.g. $v1_1$) of one of the data values (e.g. v1) is disposed in the cache line 28.x, there is also a portion (e.g. $v2_1$) of the other data value (e.g. v2) contained therein. The consequence of this is that the occurrence of a cache hit or a cache miss is independent of whether the processor core 14 accesses the first data value v1 or the second data value v2. Thus an attacker who can e.g. recognize cache misses through a power analysis, cannot draw any conclusion therefrom as to which data value v1 or v2 was accessed.

As already mentioned, in the representation of FIG. 1 the data values v1, v2 each are only as long as a field 36.x of the main memory 16 or a cache line 28.x and thus extraordinarily short. In a more practical application each data value v1, v2 comprises for example 256 bytes, whereas each field 36.x and each cache line 28.x contain for example 4 bytes of reference data. In this case the data values v1, v2 must be distributed to a total of 128 fields 36.x, so that each of these fields 36.x contains at least a portion of each of the data values v1, v2. This can take place for example in that the data values v1, v2 are written alternatingly in portions of one byte or two bytes each into the area 34, namely starting with a field boundary.

Generally the principle of the exemplary embodiments described here can be summarized as follows: An operation sequence is given which potentially—thus not necessarily upon each execution—accesses n data values vi with i= 1, 2, . . . , n. Each of the data values vi is divided into k portions $vi_j$ with j=1, 2, . . . , k. These portions $vi_j$ are now arranged in the main memory 16 in such a fashion that each field 36.x—and thus also each cache line 28.x—which contains at least one portion $vi_j$, contains also all other portions $v1_j$, $v2_j$, . . . $vn_j$.

In principle the portions $vi_j$ can be as long as desired and need not all have the same length. In many practical embodiments, however, for reasons of efficiency a uniform field length is provided, which can for example amount to 1 bit or 1 byte or 2 bytes or 1 memory word. The data values vi need not necessarily have the same length either. In some embodiments, however, data values vi of uniform length are provided. For this purpose for example shorter data values vi can be complemented by adding any desired data (padding) to achieve the same length.

Figure 2:
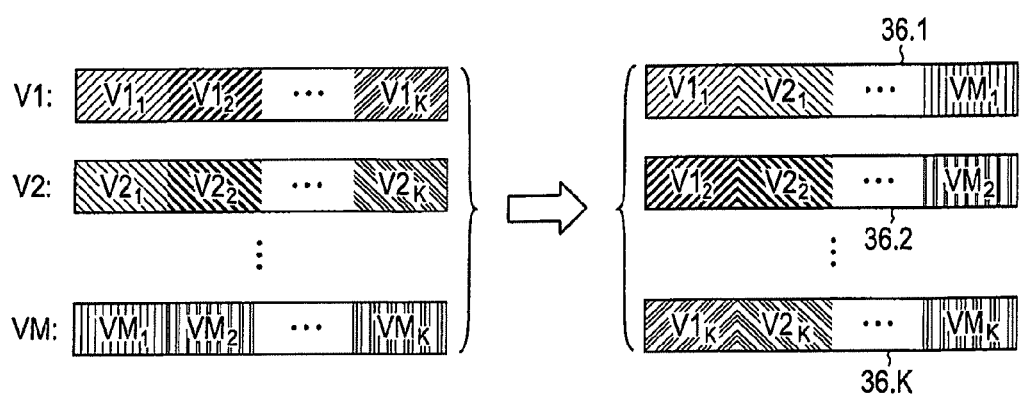
FIG. 2 shows a schematic representation of the fashion in which in an exemplary embodiment m data values are stored in k fields of the main memory.

FIG. 2 illustrates an exemplary embodiment in which each field 36.x has a length of m memory words, and the same number of data values vi with i=1, 2, . . . m are provided. If the operation sequence actually accesses only n data values with n<m, then additional data values v (n+1), . . . , vm are created at least conceptually as dummy variables. Further in this exemplary embodiment each data value vi comprises exactly k portions $vi_j$ for j=1, 2, . . . , k, each portion $vi_j$ comprising exactly one memory word. The portions $vi_j$ can then for example be stored alternatingly in the main memory 16 as follows, namely starting at a start address that is an integral multiple of the field length m:

$$v1_1, v2_1, \ldots, vm_1, v1_2, v2_2, \ldots, vm_2, \ldots, v1_k, v2_k, \ldots, vm_k$$

Again it applies that all portions $v1_j$, $v2_j$, $vm_j$ are captured jointly in each case by one cache line 28.x. Thus upon each cache access to one of these portions $v1_j$, $v2_j$, $vm_j$ it is always the same cache line 28.x that is addressed. Depending on whether the data are disposed in the cache 18 or not, a cache hit or a cache miss results. However, since the occurrence of a hit or a miss is independent of which of the portions $v1_j$, $v2_j$, . . . , $vm_j$ was to be accessed, an attacker cannot draw any conclusions from this as to the executed computation process.

In the exemplary embodiment according to FIG. 2 it was assumed that the fields 36.x—and correspondingly the cache lines 28.x—are large enough to each accommodate a portion $vi_j$ of each of the data values vi. Even if this condition is not fulfilled, the idea of the invention can be applied in further embodiments. For this purpose the fields 36.x are conceptually joined to form groups, so that every field group in total has sufficient memory space for respectively one portion $vi_j$ of each of the data values vi. The operation sequence is then changed in such a fashion that upon an access to a field 36.x that is contained in a field group, always also all other fields 36.x of this field group are accessed, even if the data contained in the other fields 36.x are not required for the computation to be executed.

In an exemplary implementation of the above-described extension n data values vi are provided, which in turn—like in the exemplary embodiment of FIG. 2—each have k portions $vi_j$ of respectively one memory word. Again the uniform length of the data values vi can be achieved by adding dummy data, if required. Further each field 36.x in the main memory comprises m memory words, however wherein in the present example n>m applies. Without limitation it is assumed that n=g m for a group size g>1; this condition can always be fulfilled by adding dummy data values.

The data values vi are then stored in the main memory 16 in the following alternating sequence, similarly to the exemplary embodiment of FIG. 2, namely with a start address that is an integral multiple of the field length m and defines the start of a field group:

$$v1_1, v2_1, \ldots, vm_1, v1_2, v2_2, \ldots, vn_2, \ldots, v1_k, v2_k, \ldots, vn_k$$

The portions $v1_j, v2_j, \ldots, vn_j$ are thus respectively disposed jointly in one single group of g consecutive fields 36.x.

The program executed by the processor core 14 is configured so that each access to a portion $vi_j$ is replaced by a sequence of accesses to the portions $v(r_1)_j, v(r_2)_j, v(r_g)_j$, wherein $r_1=i$ mod m with $r_1 \in \{1, 2, \ldots, m\}$ applies and $r_2=r_1+m$, $r_3=r_2+m$, up to $r_g=r_{(g-1)}+m$ apply. Of these portions merely the portion $vi_j$ is required; all other portions can be discarded. If for example at n=16 data values vi and a field length m=4, the operation sequence requires the portion $v7_j$, a sequence of accesses to the portions $v3_j, v7_j, v10_j, v13_j$ is executed, since $r_1=7$ mod 4=3, $r_2=r_1+4=7$, $r_3=r_2+4=10$ and $r_4=r_3+4=13$ apply.

In the above-described configuration with more than m data values vi the cache behavior upon accessing a data word vi is independent of i, since accesses inside the area $v1_j, v2_j, \ldots, vm_j$, or within the area $v(m+1)_j, v(m+2)_j, \ldots, v(2 \cdot m)_j$ and so on are covered in each case by a single cache line 28.x, and since by the access sequence $v(r_1)_j, v(r_2)_j, \ldots, v(r_g)_j$ all these areas are respectively addressed exactly once. Also here, thus, an attacker who spies out cache hits and cache misses cannot draw any conclusions as to the index i of the data value vi required by the operation sequence.

It is evident that the embodiments and implementation variants described herein are to be regarded as mere examples. Further variants and combinations of the features described herein are directly apparent to the person skilled in the art.

The invention claimed is:

1. A method for protecting an operation sequence executed by a portable data carrier from spying out, wherein the data carrier has at least a processor core, a main memory and a cache memory with a plurality of cache lines (28.x), and wherein the processor core is configured to access, upon executing the operation sequence, at least two data values (v1, v2, ..., vn, n≥2), the method comprising:

providing said plurality of cache lines (28.x) and said at least two data values (v1, v2, ..., vn, n≥2) such that the at least two data values (v1, v2, ..., vn) occupy at least one cache line of said plurality of cache lines (28.x) in the cache memory, and each of said at least two data values (v1, v2, ..., vn) are divided into several portions ($vi_j$); and providing, in each cache line of said plurality of cache lines (28.x) containing a portion ($vi_j$) of a first data value (vi), a portion ($vk_j$) of every other data value (vk), such that for each cache line of said plurality of cache lines (28.x), the occurrence of a cache miss or of a cache hit is independent of whether the first or a different data value (vk) is accessed, wherein the portable data carrier is a smart card or a chip module.

2. The method according to claim 1, wherein the data values (vi) are stored in an interleaved fashion in the main storage, so that upon loading a portion ($vi_j$) of one of these data values (vi) into at least one cache line of said plurality of cache lines (28.x) necessarily also a portion ($vk_j$) of every other data value (vk) is loaded into said at least one cache line of said plurality of cache lines (28.x).

3. The method according to claim 1, wherein each data value (vi) is divided evenly into several portions ($vi_j$).

4. The method according to claim 3, wherein the number of bits in each portion ($vi_j$) of each data value (vi) is a clean power of two and a clean fraction of the number of bits in the reference data of each cache line of said plurality of cache lines (28.x).

5. The method according to claim 1, wherein each cache line of said plurality of cache lines (28.x) is sufficiently large to accommodate respectively one portion ($vi_j$) of each data value (vi) which the processor core is able to access upon executing the operation sequence.

6. The method according to claim 1, wherein an area of the main memory is divided into a plurality of fields (36.x), wherein upon each cache miss the content of at least one of said plurality of fields (36.x) is loaded from the main memory into at least one cache line of said plurality of cache lines (28.x) and each field (36.x) of said plurality of fields (36.x) that contains a portion ($vi_j$) of one of the data values (vi) is also provided with respectively one portion ($vi_j$) of every other data value (vi).

7. The method according to claim 1, wherein each cache line of said plurality of cache lines (28.x) is smaller than required to accommodate respectively one portion ($vi_j$) of every data value (vi) and said portion ($vi_j$) is accessed by the processor core upon executing the operation sequence.

8. The method according to claim 7, wherein an area of the main memory is divided into a plurality of fields (36.x), wherein upon each cache miss the content of at least one of said plurality of fields (36.x) is loaded from the main memory into at least one cache line of said plurality of cache lines (28.x), at least two of said plurality of fields (36.x) are joined to form one field group, each field group that contains a portion ($vi_j$) of one of the data values (vi) also is provided with respectively a portion ($vi_j$) of every other data value (vi), and the operation sequence is configured so that, when the processor core accesses a portion ($vi_j$) of a data value (vi) contained in at least one of said plurality of fields (36.x) of a field group, accesses to all other fields (36.x) of said field group also take place.

9. The method according to claim 1, wherein the operation sequence is a modular exponentiation.

10. A method for protecting operation sequences executed by a portable data carrier from spying out, wherein the data carrier has at least a processor core, a main memory and a cache memory with a plurality of cache lines (28.x), and wherein the processor core is configured to access, upon executing the operation sequence, at least two data values (v1, v2, . . . , vn, n≥2), the method comprising:
  providing said plurality of cache lines (28.x) and said at least two data values (v1, v2, . . . , Vn, n≥2) such that the at least two data values (v1, v2, . . . , vn) occupy at least one cache line of said plurality of cache lines (28.x) in the cache memory, and each of said at least two data values (v1, v2, . . . , vn) are divided into several portions ($vi_j$); and
  providing in each cache line of said plurality of cache lines (28.x) containing a portion ($vi_j$) of a first data value (vi), a portion ($vk_j$) of every other data value (vk), such that for each cache line of said plurality of cache lines (28.x), the occurrence of a cache miss or of a cache hit is independent of whether the first or a different data value (vk) is accessed,
  wherein the portable data carrier is a smart card or a chip module,
  wherein the operation sequences comprise a first operation sequence in which a first operation is always executed, and a second operation sequence in which a second operation whose execution is interleaved with the first operation sequence in that the first operation sequence and the second operation sequence are each able to access the same data values (vi), and
  wherein the second operation sequence is executed only in dependence on a value to be kept secret.

11. A computer program product comprising a non-transitory medium containing plurality of program commands which cause at least one processor core of a computer to execute the method recited in claim 1.

12. A portable data carrier comprising at least a processor core, a main memory and a cache memory, wherein the data carrier is configured to execute the method recited in claim 1.

* * * * *